(12) United States Patent
Altowairqi et al.

(10) Patent No.: US 12,474,188 B2
(45) Date of Patent: Nov. 18, 2025

(54) ADJUSTABLE VENTURI SIZE DEVICE FOR MULTIPHASE FLOW METER (MPFM) USED IN OIL AND GAS INDUSTRY

(71) Applicant: SAUDI ARABIAN OIL COMPANY, Dhahran (SA)

(72) Inventors: Rashed Altowairqi, Taif (SA); Amr H. Almadani, Qurban (SA); Omar Firas Ashi, Jeddah (SA); Bader Mohammed Aljuaid, Riyadh (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 272 days.

(21) Appl. No.: 18/325,816

(22) Filed: May 30, 2023

(65) Prior Publication Data

US 2024/0401993 A1 Dec. 5, 2024

(51) Int. Cl.
*G01F 1/42* (2006.01)
*G01F 1/44* (2006.01)

(52) U.S. Cl.
CPC . *G01F 1/42* (2013.01); *G01F 1/44* (2013.01)

(58) Field of Classification Search
CPC .......... G01F 1/40; G01F 1/42; G01F 1/44
See application file for complete search history.

(56) References Cited

U.S. PATENT DOCUMENTS

| | | | |
|---|---|---|---|
| 4,026,682 A | | 5/1977 | Pausch |
| 4,094,492 A | * | 6/1978 | Beeman .................... F16K 3/03 138/45 |
| 4,790,194 A | * | 12/1988 | Bellows .................... G01F 7/00 73/861.53 |
| 7,255,012 B2 | * | 8/2007 | Hedtke ..................... F16K 3/03 73/861.61 |
| 9,671,793 B2 | | 6/2017 | Atherton |
| 10,444,771 B2 | * | 10/2019 | Karamanos .............. F24F 11/62 |
| 2011/0185805 A1 | | 8/2011 | Roux et al. |
| 2021/0262842 A1 | * | 8/2021 | Munro ...................... G01F 1/40 |
| 2022/0074304 A1 | * | 3/2022 | Mahalingam ............. G01F 1/44 |

(Continued)

FOREIGN PATENT DOCUMENTS

| | | |
|---|---|---|
| CN | 1543564 A | 11/2004 |
| CN | 112211752 B | 3/2021 |

(Continued)

OTHER PUBLICATIONS

"Performing DIY Flow Meter Maintenance in Ultrasonic Flow Meters" by Flowmeterics, Mar. 23, 2017; https://flowmetrics.com/flow-meter-maintenance-ultrasonic/.*

(Continued)

*Primary Examiner* — Justin N Olamit
(74) *Attorney, Agent, or Firm* — Osha Bergman Watanabe & Burton LLP

(57) ABSTRACT

A system includes a multiphase flow meter and a removable adjustment device. The multiphase flow meter includes a venturi having a throughbore with a first diameter, and a throat having a second diameter at a center of the venturi. The first diameter is larger than the second diameter. The removable adjustment device is installed in the throat. The removable adjustment device includes a plurality of fins; a fin controller configured to actuate the plurality of fins between an open position and a closed position; and a cover surrounding the plurality of fins.

18 Claims, 5 Drawing Sheets

(56) References Cited

U.S. PATENT DOCUMENTS

2022/0357188 A1\* 11/2022 Brown ................ G01F 15/005
2022/0373445 A1 11/2022 Zhang et al.

FOREIGN PATENT DOCUMENTS

CN 213067753 U 4/2021
CN 218890324 U 4/2023

OTHER PUBLICATIONS

"Duplex stainless steel" as published on Wikipedia on Mar. 28, 2023; https://en.wikipedia.org/wiki/Duplex_stainless_steel.\*
International Search Report issued for corresponding international patent application No. PCT/US2024/031226, mailed Sep. 26, 2024 (13 pages).
Written Opinion issued for corresponding international patent application No. PCT/US2024/031226, mailed Sep. 26, 2024 (7 pages).
W. Yoon et al.; "Flow measurement and instrumentation flow control characteristics of throttling venturi valve with adjustable area", Flow Measurement and Instrumentation; vol. 81; Oct. 2021; pp. 1-9 (9 pages).

\* cited by examiner

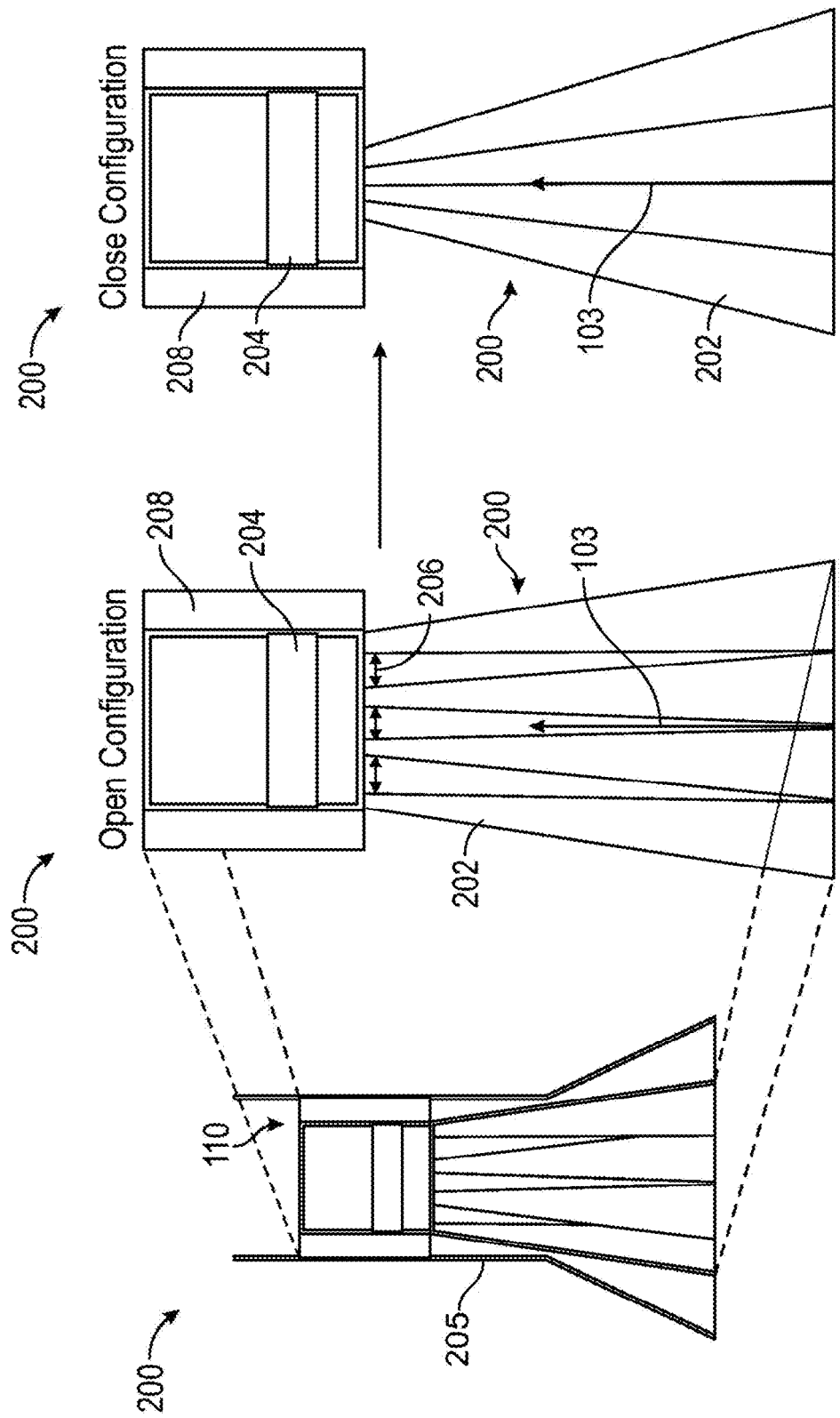

ADJUSTABLE VENTURI SIZE DEVICE FOR MULTIPHASE FLOW METER (MPFM) USED IN OIL AND GAS INDUSTRY

BACKGROUND

In the oil and gas industry, accurately monitoring fluid flow in production lines is of upmost importance. In practice, multiphase flow meter (MPFM) devices may be disposed within production lines to continuously monitor fluid flow rate of oil, gas, and water flowing through a pipe without fluid separation or sampling. Each MPFM is designed for a specific range of flow rates. In situations where a well operates outside of the designed range, the differential pressure across the MPFM may decrease, falling outside of the operational range, which results in inaccurate measurements.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, one or more embodiments of the invention relate to a system comprising: a multiphase flow meter, comprising: a venturi having a throughbore with a first diameter, and a throat having a second diameter at a center of the venturi, wherein the first diameter is larger than the second diameter; and a removable adjustment device installed in the throat, comprising: a plurality of fins; a fin controller configured to actuate the plurality of fins between an open position and a closed position; and a cover surrounding the plurality of fins.

In general, one or more embodiments of the invention relate to a removable adjustment device, comprising: a plurality of fins; a fin controller configured to actuate the plurality of fins between an open position and a closed position; and a cover surrounding the plurality of fins.

In general, one or more embodiments of the invention relate to a method, comprising: providing a multiphase flow meter in a pipe, the multiphase flow meter having a venturi and a throat; flowing a fluid with a first flow rate through the venturi; detecting, using one or more sensors disposed within the venturi, a differential pressure of the fluid; determining the differential pressure is outside of an operating range of the multiphase flow meter; sizing a removable adjustment device to have a required diameter, wherein the required diameter is selected based, at least in part, on the operating range; installing the removable adjustment device in the throat; and adjusting the differential pressure of the fluid using the removable adjustment device.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The size and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

FIGS. 2A, 2B, and 2C show a removable adjustment device in accordance with one or more embodiments.

DETAILED DESCRIPTION

Figure 1:
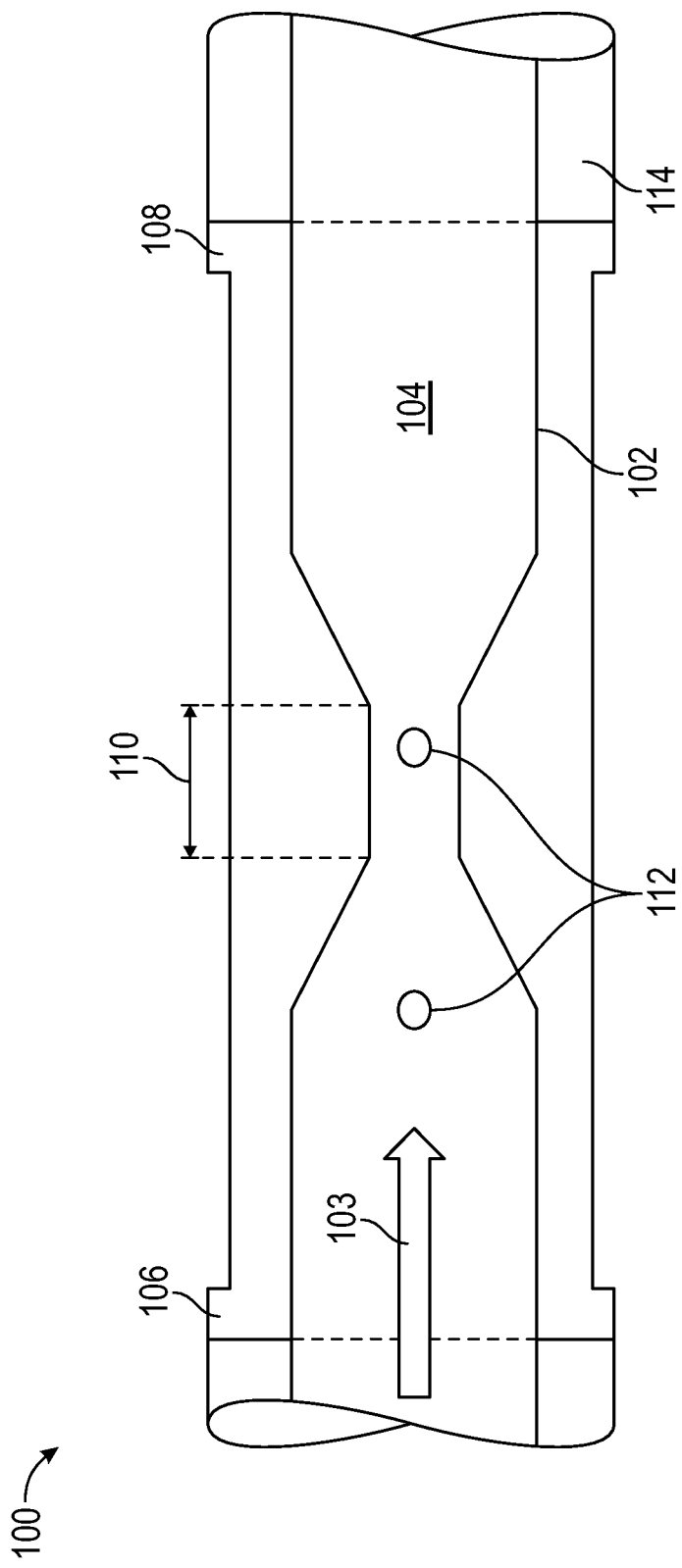
FIG. 1 shows an exemplary multiphase flow meter.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a fracture" includes reference to one or more of such fractures.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-5, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

In one aspect, embodiments disclosed herein relate to a removable adjustment device which may be retrofitted into existing MPFM devices. The removable adjustment device may be configured to alter the diameter of the venturi of existing MPFM devices to cause an increase in differential pressure across the MPFM. In another aspect, embodiments disclosed herein relate to a system including an MPFM device and a removable adjustment device installed in the throat of the MPFM. In yet another aspect, embodiments disclosed herein relate to a method of installing operating an MPFM device and installing a removable adjustment device in the MPFM device.

FIG. 1 shows an exemplary multiphase flow meter (MPFM) 100. The MPFM 100 may include a venturi 102 through which a throughbore 104 may extend. In one or more embodiments, a fluid 103 may flow through the throughbore 104 from one end of the MPFM 100 to another end. The MPFM 100 may include a first flange 106 and a second flange 108, each flange 106, 108 disposed at opposite ends of the MPFM 100 and configured to secure the MPFM 100 to a pipe 114. A throat 110 may be formed in a central portion of the venturi 102, where the diameter of the throat 110 is smaller than the diameter of the venturi 102.

One or more sensors 112 may be disposed within the throughbore 104. For example, in one or more embodiments, a first sensor 112 may be disposed in the throughbore 104 prior to the throat 110 and a second sensor 112 may be disposed in the throughbore 104 within the throat 110. The sensors 112 may be used to determine a differential pressure of the fluid 103 as it flows through the MPFM 100.

Turning now to FIGS. 2A-2C, FIGS. 2A-2C show a removable adjustment device 200 in accordance with one or more embodiments. More specifically, FIG. 2A shows a side view of a removable adjustment device 200 with a removable adjustment cover 205 installed. FIG. 2B shows a side view of a removable adjustment device 200 in an open configuration and FIG. 2C shows a side view of a removable adjustment device 200 in a closed configuration.

Referring to FIGS. 2B-2C, the removable adjustment device 200 may include a number of fins 202. The fins 202 have a wedge shape. The shape was chosen to ensure a free space 206 between each fin 202 at the throat 110 of the removable adjustment device 200 at the top while ensuring the integrity of the flow inlet at the bottom. The free space 206 between each of the fins 202 is controlled by a fin controller 204. As the free space 206 between the fins 202 reduces, the diameter of the throat will be reduced. Depending on the received flow, the free space 206 between each of the fins 202 will be the variable to control. In one or more embodiments, the fins 202 are made of rigid duplex stainless steel and may be covered by a flexible duplex sheet of stainless steel to ensure fluid does not escape from the inlet as well as sealing the throat 110.

As mentioned above, movement of the fins 202 is controlled by the fin controller 204 such that the free space 206 between each of the fins 202 is the controllable variable in the removable adjustment device 200. In one or more embodiments, the fin controller 204 assists in positioning the fins mechanically by a user before setting the removable adjustment device 200 inside the flowmeter. Thus, as the fin controller 204 is manually actuated by the user, the removable adjustment device 200 do not need to contain any electronics. Such a design does not require any pressure sensors or motors, which could take up space in the throat 110 and, in turn, reduce the operating range of the removable adjustment device 200. In these embodiments of the removable adjustment device 200, the system utilizes pressure sensors installed in the MPFM 100.

Figure 3A:
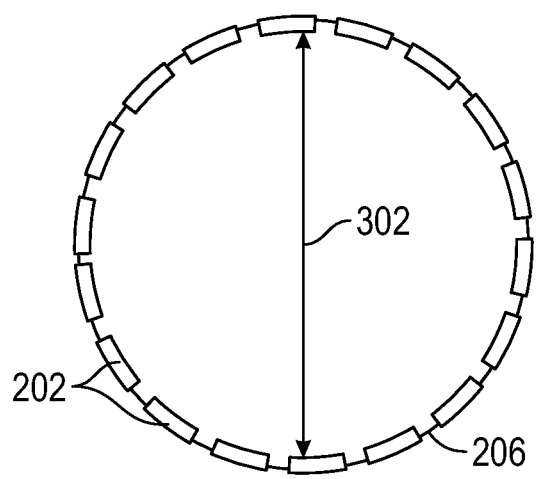
FIGS. 3A and 3B show a removable adjustment device in accordance with one or more embodiments.
Figure 3B:
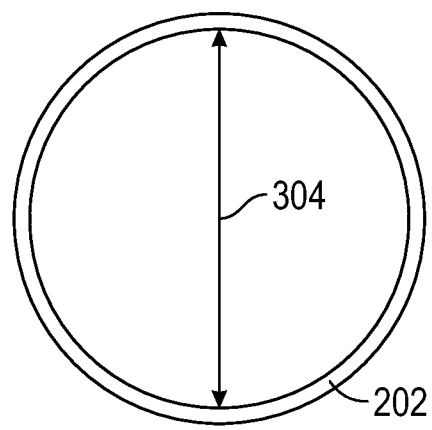

In one or more embodiments, the fins 202 may be configured to move between an open configuration and a closed configuration. As shown in FIGS. 3A and 3B, each of the open configuration and the closed configuration may have a different diameter created by relative movement of the fins 202. For example, when the fins 202 are in the open configuration, shown in FIG. 3A, the removable adjustment device 200 may have an open diameter 302. In the same manner, then the fins 202 are in the closed configuration, shown in FIG. 3B, the removable adjustment device 200 may have a closed diameter 304. In one or more embodiments, the open diameter 302 may be larger than the closed diameter 304. The fins 202 may be moved between the open configuration and the closed configuration in order to achieve a desired differential pressure, and, as such, the inner diameter of the removable adjustment device 200 may vary anywhere between the open diameter 302 and the closed diameter 304.

Turning back to FIGS. 2A and 2B, a cover 205 may be positioned around the fins 202. In one or more embodiments, the cover 205 may be composed of a metal and may be configured to protect the fins 202 from debris. Further, the cover 205 may assist in sealing the removable adjustment device 200. A sealing element 208 may be fitted around the removable adjustment device 200 to assist in sealing an annular region formed between an exterior of the removable adjustment device 200 and the wall of the throat 110.

In one or more embodiments, the removable adjustment device 200 may be installed in the throat 110 of the MPFM 100 such that the removable adjustment device 200 may restrict the diameter of the throat 110 to produce a differential pressure in a desired operational range. More specifically, movement of the fins 202 may restrict the diameter of the throat 110 in order to increase the differential pressure of the fluid 103 as it flows through the MPFM 100. The fluid 103 may enter the removable adjustment device 200 from a first end, shown in FIGS. 4A and 4B. In one or more embodiments, the first end may also be referred to as the bottom of the removable adjustment device 200. The restricted diameter of the removable adjustment device 200 may create an increase in differential pressure in concert with maintaining the original flow rate of the fluid 103.

Figure 4A:
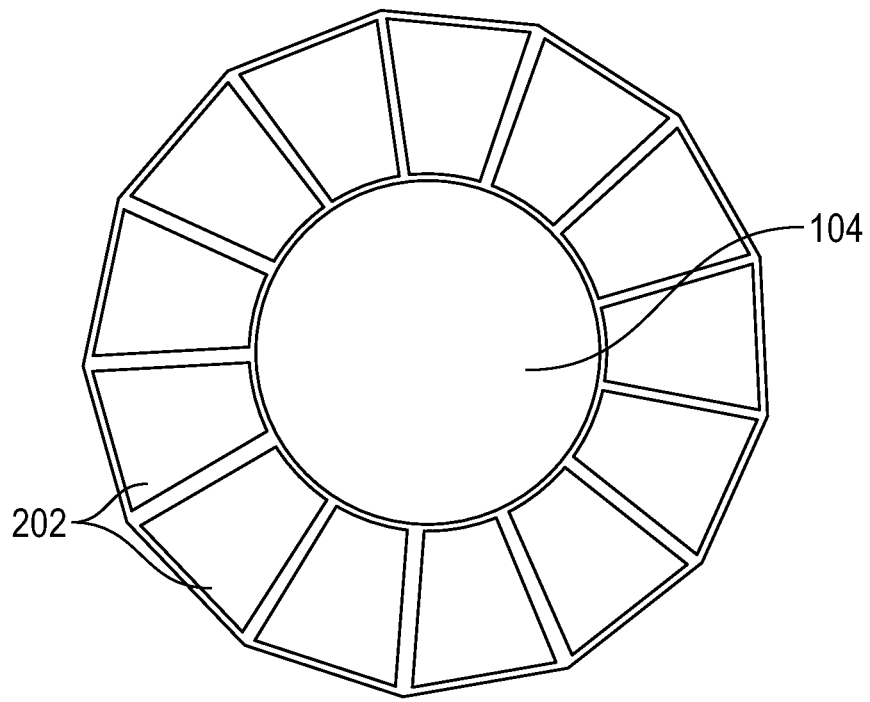
FIGS. 4A and 4B show a removable adjustment device in accordance with one or more embodiments.
Figure 4B:
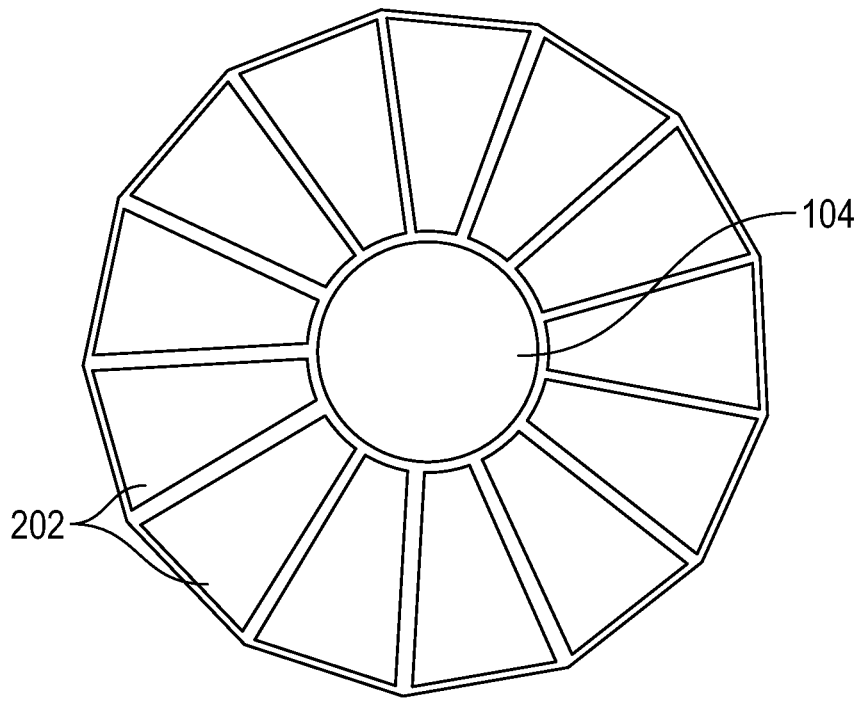

FIGS. 4A and 4B show the bottom view of the device where the fluid flow 103 will enter. The fins 202 are connected and do not have a free to ensure the integrity of the inlet. Whereas FIGS. 3A and 3B show the top view near the throat of the device. In the open configuration, the fins 202 at this area will each have a free space 206 in between. This design ensures a flexible diameter range to adjust the venturi. The fins 202 at the top and the throat both will have a sheet of duplex stainless steel to cover the space and to ensure the integrity of the device 200.

Figure 5:
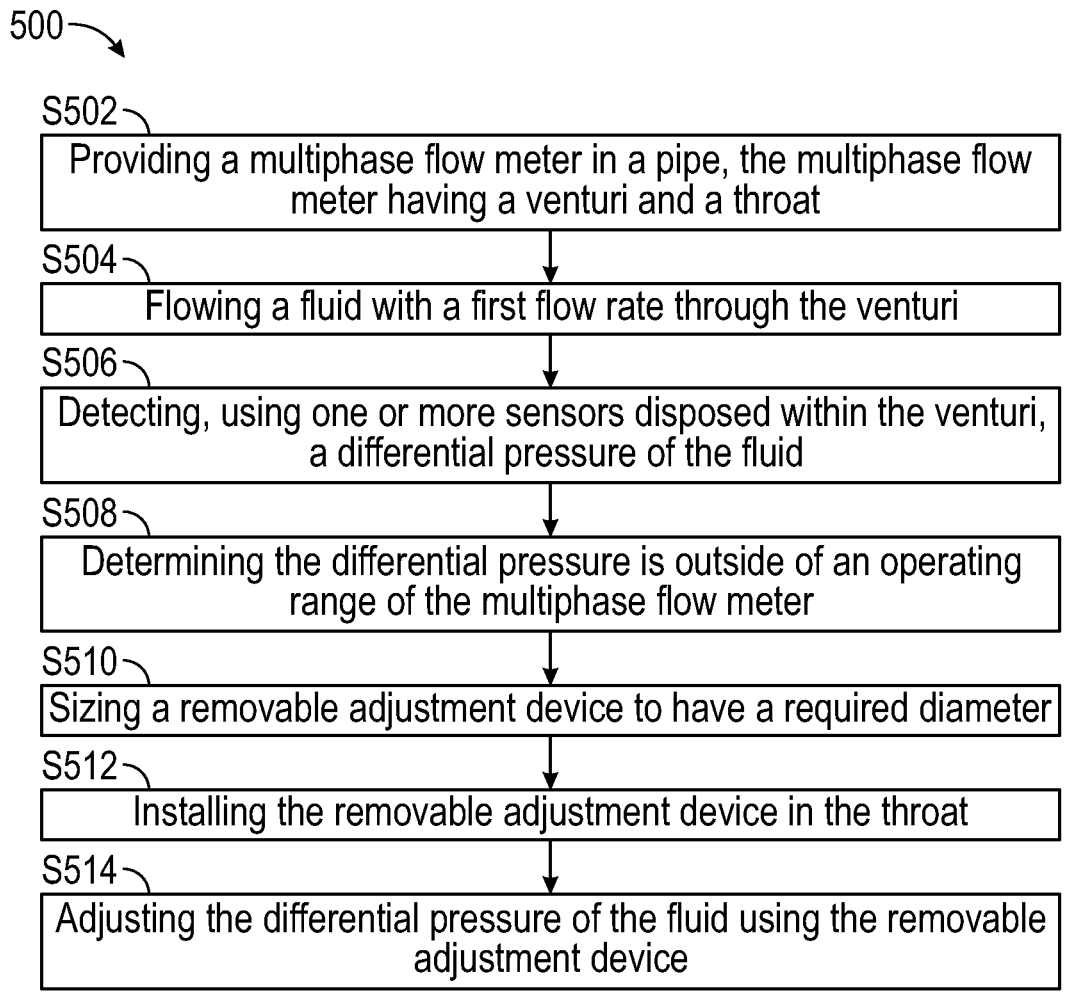
FIG. 5 shows a flowchart of a method in accordance with one or more embodiments.

FIG. 5 depicts a flowchart in accordance with one or more embodiments. More specifically, FIG. 5 depicts a flowchart 500 of a method of creating a transverse fracture in a formation. Further, one or more blocks in FIG. 5 may be performed by one or more components as described in FIG. 1-4B. While the various blocks in FIG. 5 are presented and described sequentially, one of ordinary skill in the art will appreciate that some or all of the blocks may be executed in different orders, may be combined, may be omitted, and some or all of the blocks may be executed in parallel. Furthermore, the blocks may be performed actively or passively.

Initially, a multiphase flow meter (MPFM) 100 may be provided in a pipe 114, S502. In one or more embodiments, the MPFM 100 may include a venturi 102 and a throat 110. A fluid 103 may be introduced to the MPFM 100, such that it may flow with a first rate through the venturi 102, S504. In one or more embodiments, the first flow rate may be selected based on an operational differential pressure range of the MPFM 100. Specifically, differential pressures below a minimum value, which may be the lowest value of the operational range, may result in inaccurate measurements and increased uncertainty.

Using one or more sensors 112, which may be disposed within the venturi 102 and the throat 110 of the MPFM 100, a differential pressure of the fluid 103 may be detected, S506. Further, once detected, the differential pressure may be compared to the operational range of the MPFM 100. In one or more embodiments, it may be determined that the differential pressure is outside of the operating range of the MPFM 100 and, as such, requires correction, S508.

A removable adjustment device 200 may be sized to have a required diameter, S510. More specifically, the difference between the differential pressure detected and the minimum differential pressure may be determined and, using the first flow rate of the fluid 103, a diameter of the removable adjustment device 200 (and therefore, once the device is installed, the throat 110) may be calculated. In particular, the diameter of the removable adjustment device 200 may be calculated in order to produce a required differential pressure without altering the flow rate of the fluid 103.

Sizing the removable adjustment device 200 may include moving a plurality of fins 202 using a fin controller 204. In one or more embodiments, the fin controller 204 allows for a mechanical setting of the positions of the fins 202. Specifically, the fins 202 may be moved so that the removable adjustment device 200 has a diameter equal to the calculated diameter. In one or more embodiments, the calculated diameter may be within the range between the open diameter 302 and the closed diameter 304.

Once sized appropriately, the removable adjustment device 200 may be installed in the throat 110 of the MPFM 100, S512. In one or more embodiments, installation of the removable adjustment device 200 may require isolation of the MPFM 100. The MPFM 100 may be depressurized and any fluid 103 contained within the MPFM 100 may be drained. The first flange 106 and the second flange 108 may be unscrewed, allowing for the removable adjustment device 200 to be secured inside the throat 110 using a sealing element 208. Once secured into the MPFM 100, the removable adjustment device 200 may be used to adjust the differential pressure of the fluid 103 to fall within the operational range.

Embodiments of the present disclosure may provide at least one of the following advantages. Low fluid differential pressures can lead to inaccurate measurements, which may lead to difficulties in optimizing well production and performing well modelling and simulations. Further, replacing entire multiphase flow meters can be costly and time consuming. Embodiments of the present disclosure allow for the retrofitting of a removable adjustment device to existing multiphase flow meters for the purpose of adjusting the fluid differential pressure so that it falls within a desired operational range. This may prolong and maximize the life and value of the multiphase flow meter. Further, such a device may assist in improving measurement accuracy, increasing efficiency of well operations.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A system comprising:
    a multiphase flow meter, comprising:
        a venturi having a throughbore with a first diameter, and
        a throat having a second diameter at a center of the venturi,
        wherein the first diameter is larger than the second diameter; and
        a removable adjustment device installed in the throat, comprising:
    a plurality of fins;
    a fin controller configured to actuate the plurality of fins between an open position and a closed position; and
    a cover surrounding the plurality of fins,
    wherein each fin of the plurality of fins has a wedge shape,
    wherein, when the plurality of fins is actuated to the open position, a free space is positioned between each adjacent pair of fins of the plurality of fins, and
    wherein a width of the wedge shape of each fin of the plurality of fins decreases from a first end of the throat to a second end of the throat.

2. The system of claim 1, further comprising one or more sensors configured to measure a differential pressure across the venturi.

3. The system of claim 1, further comprising a motor coupled between the fin controller and the plurality of fins.

4. The system of claim 1, wherein the open position has a first inner diameter and the closed position has a second inner diameter, and wherein the first inner diameter is larger than the second inner diameter.

5. The system of claim 1, further comprising a sealing element secured between an outer portion of each of the plurality of fins and an inner surface of the throat.

6. The system of claim 1, wherein each of the plurality of fins are made of rigid duplex stainless steel covered by a flexible duplex sheet of stainless steel.

7. The system of claim 1, wherein the cover is composed of a metal.

8. A removable adjustment device, comprising:
    a plurality of fins;
    a fin controller configured to actuate the plurality of fins between an open position and a closed position; and
    a cover surrounding the plurality of fins, wherein each fin of the plurality of fins has a wedge shape,
wherein, when the plurality of fins is actuated to the open position, a free space is positioned between each adjacent pair of fins of the plurality of fins,
wherein, when the plurality of fins is actuated to the closed position, the plurality of free spaces are covered by the plurality of fins, and
wherein a width of the wedge shape of each fin of the plurality of fins decreases from a first end of the removable adjustment device to a second end of the removable adjustment device.

9. The removable adjustment device of claim 8, further comprising a motor coupled between the fin controller and the plurality of fins.

10. The removable adjustment device of claim 8, wherein the open position has a first inner diameter and the closed position has a second inner diameter, and wherein the first inner diameter is larger than the second inner diameter.

11. The removable adjustment device of claim 8, wherein each of the plurality of fins are made of rigid duplex stainless steel covered by a flexible duplex sheet of stainless steel.

12. The removable adjustment device of claim 8, wherein the cover is composed of a metal.

13. A method, comprising:
providing a multiphase flow meter in a pipe, the multiphase flow meter having a venturi and a throat;
flowing a fluid with a first flow rate through the venturi;
detecting, using one or more sensors disposed within the venturi, a differential pressure of the fluid;
determining the differential pressure is outside of an operating range of the multiphase flow meter;
sizing a removable adjustment device to have a required diameter by actuating a plurality of fins of the removable adjustment device to an open position and a closed position,
wherein the required diameter is selected based, at least in part, on the operating range;
installing the removable adjustment device in the throat; and
adjusting the differential pressure of the fluid using the removable adjustment device,
wherein each fin of the plurality of fins has a wedge shape,
wherein, when the plurality of fins is actuated to an open position, a free space is positioned between each adjacent pair of fins of the plurality of fins, and
wherein a width of the wedge shape of each fin of the plurality of fins decreases from a first end of the throat to a second end of the throat.

14. The method of claim 13, wherein installing the removable adjustment device comprises:
isolating the multiphase flow meter;
depressurizing the multiphase flow meter;
draining a volume of fluid disposed within the multiphase flow meter;
unscrewing a first flange and a second flange of the multiphase flow meter; and
securing the removable adjustment device inside the throat using a sealing element.

15. The method of claim 13, wherein sizing the removable adjustment device comprises opening or closing a plurality of fins of the removable adjustment device using a fin controller.

16. The method of claim 13, wherein adjusting the differential pressure of the fluid comprises:
adjusting an inner diameter of the venturi; and
maintaining the first flow rate.

17. The method of claim 13, further comprising prolonging a service life of the multiphase flow meter based on the sizing of the removable adjustment device.

18. The method of claim 13, further comprising mechanically setting the sizing of the removable adjustment device.

\* \* \* \* \*